US012320370B2

(12) United States Patent
Okada

(10) Patent No.: US 12,320,370 B2
(45) Date of Patent: Jun. 3, 2025

(54) SOLENOID VALVE CONTROL DEVICE

(71) Applicant: SMC CORPORATION, Tokyo (JP)

(72) Inventor: Yui Okada, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 93 days.

(21) Appl. No.: 18/307,971

(22) Filed: Apr. 27, 2023

(65) Prior Publication Data

US 2024/0077090 A1 Mar. 7, 2024

(30) Foreign Application Priority Data

May 9, 2022 (JP) ................................ 2022-077010
Jul. 29, 2022 (JP) ................................ 2022-121732

(51) Int. Cl.
*F15B 13/044* (2006.01)
*F15B 13/08* (2006.01)

(52) U.S. Cl.
CPC ........ *F15B 13/044* (2013.01); *F15B 13/0817* (2013.01)

(58) Field of Classification Search
None
See application file for complete search history.

(56) References Cited

U.S. PATENT DOCUMENTS 8,375,986 B2 * 2/2013 Miyazoe ............. F15B 13/0857 137/884
9,004,108 B2 * 4/2015 Okamoto ................ F16K 31/06 700/282
9,488,990 B2 * 11/2016 Morikawa ............. F15B 20/008
2006/0011240 A1 1/2006 Berner et al.
2014/0048162 A1 * 2/2014 Okamoto ................ H01F 7/064 137/884
2019/0245294 A1 8/2019 Forcht et al.

FOREIGN PATENT DOCUMENTS

CN 110971219 A 4/2020
JP 2511402 Y2 9/1996

OTHER PUBLICATIONS

Extended European Search Report Issued Sep. 27, 2023 in European Application 23170614.4, 9 pages.

* cited by examiner

*Primary Examiner* — Matthew W Jellett

(74) *Attorney, Agent, or Firm* — Oblon, McClelland, Maier & Neustadt, L.L.P.

(57) ABSTRACT

A solenoid valve control device includes a control module that outputs control signals to control solenoid valves, and a plurality of solenoid valve modules having control lines connected to the control module and that transmit the control signals to the solenoid valves, wherein the solenoid valve modules are connected to the control module or another of the solenoid valve modules, and each of the solenoid valve modules includes a data line that transmits to the control module pressure information detected by a pressure sensor that detects the pressure of air supplied to a pneumatic device.

4 Claims, 3 Drawing Sheets

SOLENOID VALVE CONTROL DEVICE

CROSS-REFERENCE TO RELATED APPLICATIONS

This application is based upon and claims the benefit of priority from Japanese Patent Applications No. 2022-077010 filed on May 9, 2022 and No. 2022-121732 filed on Jul. 29, 2022, the contents all of which are incorporated herein by reference.

BACKGROUND OF THE INVENTION

Field of the Invention

The present invention relates to a solenoid valve control device configured to control solenoid valves.

Description of the Related Art

JP 2,511,402 Y2 discloses a solenoid valve manifold. The solenoid valve manifold includes a plurality of manifold blocks, and a plurality of solenoid valve mechanisms. Each of the manifold blocks includes a flow path through which air flows. The solenoid valve mechanisms are attached to each of the manifold blocks. The solenoid valve mechanisms include solenoid valves that switch the flow path of the air flowing through the manifold blocks.

SUMMARY OF THE INVENTION

In the solenoid valve manifold disclosed in the above-described JP 2,511,402 Y2, pressure sensors are provided in order to detect the pressure of the air supplied to a pneumatic cylinder from each of the manifold blocks. Data lines for delivering pressure information detected by the pressure sensors to a PLC (Programmable Logic Controller) or the like are arranged externally of the solenoid valve manifold. Therefore, a problem arises in that the configuration of the wiring becomes complicated.

The present invention has the object of solving the aforementioned problem.

An aspect of the present invention is characterized by a solenoid valve control device that controls solenoid valves configured to switch a flow path through which air is supplied to a pneumatic device, the solenoid valve control device including a control module configured to output control signals to control the solenoid valves, and a plurality of solenoid valve modules including control lines connected to the control module and configured to transmit the control signals to the solenoid valves, wherein each of the solenoid valve modules is connected to the control module or to another of the solenoid valve modules, and each of the solenoid valve modules includes a data line configured to transmit to the control module, pressure information detected by a pressure sensor configured to detect a pressure of air supplied to the pneumatic device, a clock line configured to transmit a clock signal from the control module to the pressure sensor, and an electrical power source line configured to supply electrical power to drive the pressure sensor from the control module to the pressure sensor.

According to the present invention, since the data lines are wired internally of the solenoid valve control device, the number of the data lines arranged externally of the solenoid valve control device can be reduced. As a result, the wiring configuration can be simplified.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

Figure 1:
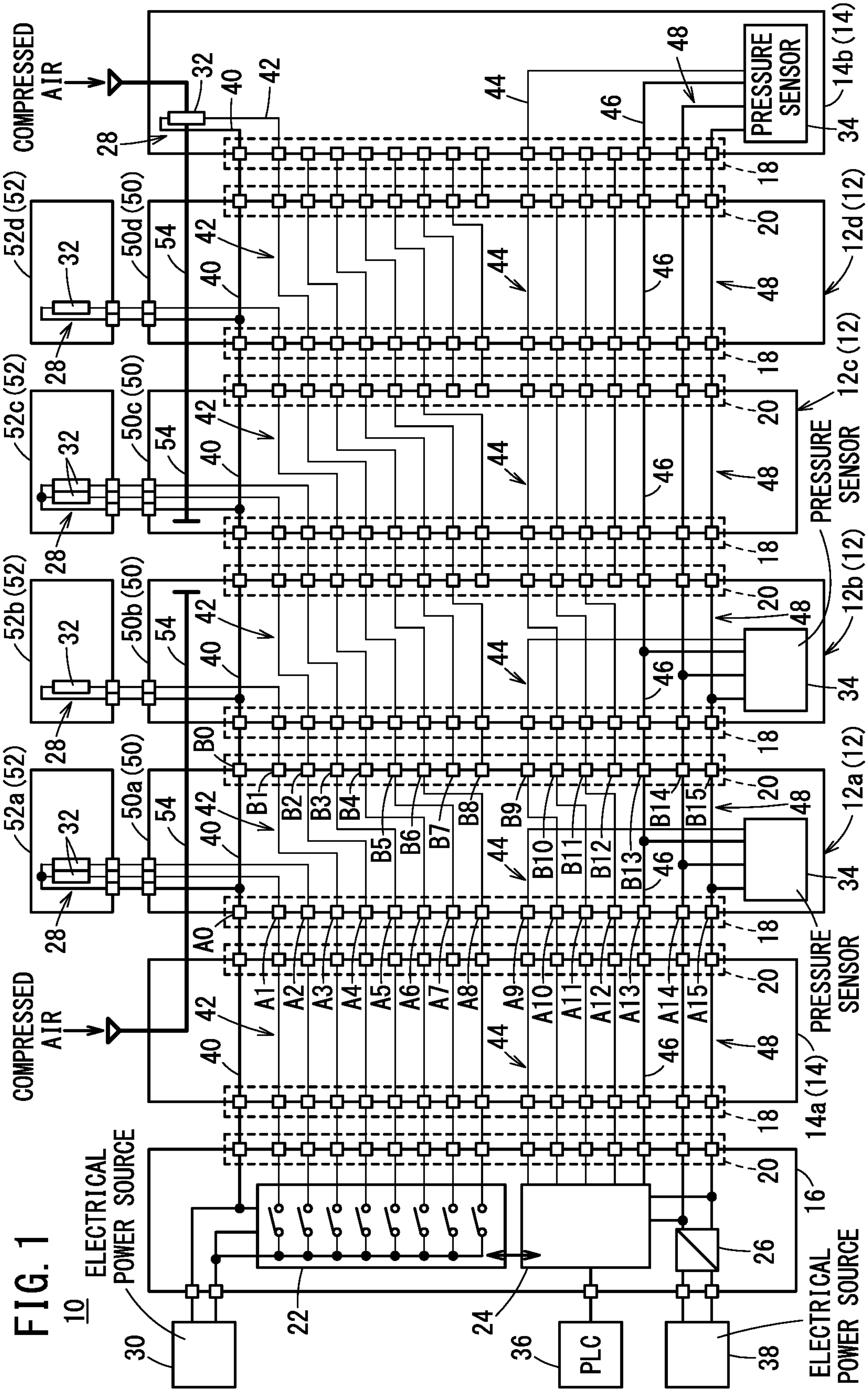
FIG. 1 is a schematic diagram of a valve manifold.

FIG. 1 is a schematic diagram of a valve manifold 10. The valve manifold 10 according to the present embodiment is used in an air cylinder system and a vacuum ejector system. The air cylinder system is a system that delivers to a pneumatic device the compressed air supplied from an air pump connected to the valve manifold 10, and thereby causes the pneumatic device to be operated. In the air cylinder system, the pneumatic device, for example, is an air cylinder, an air chuck, or the like. The vacuum ejector system is a system that causes a negative pressure to be generated by compressed air that is supplied from an air pump connected to the valve manifold 10, and draws in air from a pneumatic device that is connected to the valve manifold 10. In the vacuum ejector system, the pneumatic device, for example, is a suction pad or the like.

In the valve manifold 10, a plurality of solenoid valve modules 12 and a plurality of air supply and exhaust blocks 14 can be connected to each other. A control module 16 is connected with respect to the connected plurality of solenoid valve modules 12, and the plurality of air supply and exhaust blocks 14.

The valve manifold 10 according to the present embodiment includes, as the solenoid valve modules 12, a first solenoid valve module 12*a*, a second solenoid valve module 12*b*, a third solenoid valve module 12*c*, and a fourth solenoid valve module 12*d*. The valve manifold 10 according to the present embodiment includes, as the air supply and exhaust blocks 14, an intermediate air supply and exhaust block 14*a*, and a terminal air supply and exhaust block 14*b*. In the valve manifold 10 according to the present embodiment, the control module 16, the intermediate air supply and exhaust block 14*a*, the first solenoid valve module 12*a*, the second solenoid valve module 12*b*, the third solenoid valve module 12*c*, the fourth solenoid valve module 12*d*, and the terminal air supply and exhaust block 14*b* are connected sequentially in this order.

The mode of connection of the present embodiment illustrated in FIG. 1 is shown as an example, and the order in which each of the solenoid valve modules 12 and each of the air supply and exhaust blocks 14 are connected is selected by the user. Further, the number of the solenoid valve modules 12 and the number of the air supply and exhaust blocks 14 in the valve manifold 10 are selected by the user.

Each of the intermediate air supply and exhaust block 14*a*, the first solenoid valve module 12*a*, the second solenoid valve module 12*b*, the third solenoid valve module 12*c*, the fourth solenoid valve module 12*d*, and the terminal air supply and exhaust block 14*b* includes a first connector 18. Each of the first connectors 18 has terminals A0 to A15.

Each of the control module 16, the intermediate air supply and exhaust block 14*a*, the first solenoid valve module 12*a*, the second solenoid valve module 12*b*, the third solenoid valve module 12*c*, and the fourth solenoid valve module 12*d* includes a second connector 20. Each of the second connectors 20 has terminals B0 to B15.

By the first connectors 18 and the second connectors 20 being connected, the control module 16, the intermediate air supply and exhaust block 14*a*, the first solenoid valve module 12*a*, the second solenoid valve module 12*b*, the third solenoid valve module 12*c*, the fourth solenoid valve module 12*d*, and the terminal air supply and exhaust block 14*b* are connected.

When the first connectors 18 and the second connectors 20 are connected, the terminals A0 of the first connectors 18 and the terminals B0 of the second connectors 20 are brought into contact with each other, and the terminals A0 and the terminals B0 are electrically connected. Similarly, when the first connectors 18 and the second connectors 20 are connected, each of the terminals A1 to A15 of the first connectors 18 and each of the terminals B1 to B15 of the second connectors 20 come into contact with each other, and each of the terminals A1 to A15 and each of the terminals B1 to B15 are electrically connected.

The terminal A9 of each of the first connectors 18 corresponds to the first terminal of the present invention. The terminal A10 of each of the first connectors 18 corresponds to the second terminal of the present invention. The terminal B9 each of the second connectors 20 corresponds to the third terminal of the present invention.

[Configuration of the Control Module]

The control module 16 includes an output driver 22, a control circuit 24, and an internal electrical power source 26. The output driver 22 outputs control signals. Based on the control signals, solenoid valves 28 respectively provided in the solenoid valve modules 12 and the terminal air supply and exhaust block 14*b* are driven. The output driver 22 includes semiconductor switches that are provided corresponding to the respective solenoid valves 28. By turning on the semiconductor switches, electrical power is supplied from a driving electrical power source 30 to coils 32 of the solenoid valves 28.

The control circuit 24 serves to control the output driver 22. The control circuit 24 carries out communication with pressure sensors 34 provided in the first solenoid valve module 12*a*, the second solenoid valve module 12*b*, and the terminal air supply and exhaust block 14*b*. Each of the pressure sensors 34 is equipped with an amplifier circuit, an AD conversion circuit, a communication circuit, and the like. Therefore, the pressure sensors 34 are each capable of carrying out communication individually with the control circuit 24. The control circuit 24 communicates with a PLC 36 and other devices. The other devices, for example, are other valve manifolds 10 or the like. The internal electrical power source 26 supplies electrical power to the control circuit 24 and the pressure sensors 34.

The control module 16 includes an electrical power interface (not shown), and a communication interface (not shown). The electrical power interface adjusts the voltage of the electrical power supplied from the driving electrical power source 30, and delivers the adjusted electrical power to the output driver 22 and the solenoid valves 28. The electrical power interface adjusts the voltage of the electrical power supplied from a controlling electrical power source 38, and delivers the adjusted electrical power to the control circuit 24 and the pressure sensors 34.

In the second connector 20 of the control module 16, the terminal B0 is connected to a positive electrode of the driving electrical power source 30. The terminals B1 to B8 are connected to respective switches of the output driver 22. The terminals B9 to B13 are connected to the control circuit 24. The terminal B14 is connected to a positive electrode of the internal electrical power source 26. The terminal B15 is connected to a negative electrode of the internal electrical power source 26.

[Configuration of the Intermediate Air Supply and Exhaust Block]

Compressed air is supplied from the exterior to the intermediate air supply and exhaust block 14*a*. The compressed air supplied to the intermediate air supply and exhaust block 14*a* is delivered to the first solenoid valve module 12*a* and the second solenoid valve module 12*b*.

A common electrical power source line 40 is provided in the intermediate air supply and exhaust block 14*a*. The common electrical power source line 40 is electrically connected between the terminal A0 of the first connector 18 and the terminal B0 of the second connector 20. The common electrical power source line 40 is connected to the positive electrode of the driving electrical power source 30 via the control module 16.

A plurality of control lines 42 are provided in the intermediate air supply and exhaust block 14*a*. One of the control lines 42 is electrically connected between the terminal A1 of the first connector 18 and the terminal B1 of the second connector 20. Similarly, the other control lines 42 are electrically connected between the terminal A2 and the terminal B2, between the terminal A3 and the terminal B3, between the terminal A4 and the terminal B4, between the terminal A5 and the terminal B5, between the terminal A6 and the terminal B6, between the terminal A7 and the terminal B7, and between the terminal A8 and the terminal B8. The control lines 42 are connected to the negative electrode of the driving electrical power source 30 via the control module 16.

A plurality of data lines 44 are provided in the intermediate air supply and exhaust block 14*a*. The data lines 44 are signal lines that deliver the pressure information detected by each of the pressure sensors 34 to the control circuit 24 of the control module 16. One of the data lines 44 is electrically connected between the terminal A9 of the first connector 18 and the terminal B9 of the second connector 20. Similarly, the other data lines 44 are electrically connected between the terminal A10 and the terminal B10, between the terminal A11 and the terminal B11, and between the terminal A12 and the terminal B12.

A clock line 46 is provided in the intermediate air supply and exhaust block 14*a*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20.

Two internal electrical power source lines 48 are provided in the intermediate air supply and exhaust block 14*a*. One of the internal electrical power source lines 48 is electrically connected between the terminal A14 of the first connector 18 and the terminal B14 of the second connector 20. Similarly, the other of the internal electrical power source lines 48 is electrically connected between the terminal A15 and the terminal B15.

[Configuration of the First Solenoid Valve Module]

The first solenoid valve module 12*a* includes a first manifold block 50*a* and a first solenoid valve block 52*a*.

A flow path 54 is formed in the first manifold block 50*a*. Compressed air that is delivered from the intermediate air supply and exhaust block 14*a* flows through the interior of the flow path 54. In the first manifold block 50*a*, a negative pressure is generated by the compressed air that flows through the interior of the flow path 54. The first manifold block 50*a* draws in air from a pneumatic device or the like that is connected to the first manifold block 50*a*.

The pressure sensor 34 is provided in the first manifold block 50*a*. The pressure sensor 34 provided in the first manifold block 50*a* detects the pressure of the air drawn in from the pneumatic device or the like that is connected to the first manifold block 50*a*.

The first solenoid valve block 52*a* includes the solenoid valve 28. The solenoid valve 28 in the first solenoid valve block 52*a* includes two coils 32.

A common electrical power source line 40 is provided in the first solenoid valve block 52*a*. The common electrical power source line 40 is electrically connected between the terminal A0 of the first connector 18 and the terminal B0 of the second connector 20. The common electrical power source line 40 is connected to one end of each of the coils 32 of the solenoid valve 28 in the first solenoid valve block 52*a*.

A plurality of control lines 42 are provided in the first manifold block 50*a*. One of the control lines 42 is electrically connected between the terminal A1 of the first connector 18 and the other end of one of the coils 32 of the solenoid valve 28 in the first solenoid valve block 52*a*. Another of the control lines 42 is electrically connected between the terminal A2 of the first connector 18 and the other end of the other of the coils 32 of the solenoid valve 28 in the first solenoid valve block 52*a*.

Another of the control lines 42 is electrically connected between the terminal A3 of the first connector 18 and the terminal B1 of the second connector 20. Similarly, the other control lines 42 are electrically connected between the terminal A4 and the terminal B2, between the terminal A5 and the terminal B3, between the terminal A6 and the terminal B4, between the terminal A7 and the terminal B5, and between the terminal A8 and the terminal B6.

A plurality of data lines 44 are provided in the first manifold block 50*a*. The data lines 44 are signal lines that deliver the pressure information detected by each of the pressure sensors 34 to the control circuit 24 of the control module 16. One of the data lines 44 is electrically connected between the terminal A9 of the first connector 18 and the pressure sensor 34 provided in the first manifold block 50*a*. Another of the data lines 44 is electrically connected between the terminal A10 of the first connector 18 and the terminal B9 of the second connector 20. Similarly, the other data lines 44 are electrically connected between the terminal A11 and the terminal B10, and between the terminal A12 and the terminal B11.

A clock line 46 is provided in the first manifold block 50*a*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20. The clock line 46 is connected to the pressure sensor 34 that is provided in the first manifold block 50*a*.

Two internal electrical power source lines 48 are provided in the first manifold block 50*a*. One of the internal electrical power source lines 48 is electrically connected between the terminal A14 of the first connector 18 and the terminal B14 of the second connector 20. The other of the internal electrical power source lines 48 is electrically connected between the terminal A15 of the first connector 18 and the terminal B15 of the second connector 20. Each of the two internal electrical power source lines 48 is connected to the pressure sensor 34 that is provided in the first manifold block 50*a*.

[Configuration of the Second Solenoid Valve Module]

The second solenoid valve module 12*b* includes a second manifold block 50*b* and a second solenoid valve block 52*b*.

A flow path 54 is formed in the second manifold block 50*b*. Compressed air that is delivered from the intermediate air supply and exhaust block 14*a* flows through the interior of the flow path 54. In the second manifold block 50*b*, a negative pressure is generated by the compressed air that flows through the interior of the flow path 54. The second manifold block 50*b* draws in air from a pneumatic device or the like that is connected to the second manifold block 50*b*.

The pressure sensor 34 is provided in the second manifold block 50*b*. The pressure sensor 34 provided in the second manifold block 50*b* detects the pressure of the air drawn in from the pneumatic device or the like that is connected to the second manifold block 50*b*.

The second solenoid valve block 52*b* includes the solenoid valve 28. The solenoid valve 28 in the second solenoid valve block 52*b* includes one coil 32.

A common electrical power source line 40 is provided in the second solenoid valve block 52*b*. The common electrical power source line 40 is electrically connected between the terminal A0 of the first connector 18 and the terminal B0 of the second connector 20. The common electrical power source line 40 is connected to one end of the coil 32 of the solenoid valve 28 in the second solenoid valve block 52*b*.

A plurality of control lines 42 are provided in the second manifold block 50*b*. One of the control lines 42 are electrically connected between the terminal A1 of the first connector 18 and the other end of the coil 32 of the solenoid valve 28 in the second solenoid valve block 52*b*.

Another of the control lines 42 is electrically connected between the terminal A2 of the first connector 18 and the terminal B1 of the second connector 20. Similarly, the other control lines 42 are electrically connected between the terminal A3 and the terminal B2, between the terminal A4 and the terminal B3, between the terminal A5 and the terminal B4, between the terminal A6 and the terminal B5, between the terminal A7 and the terminal B6, and between the terminal A8 and the terminal B7.

A plurality of data lines 44 are provided in the second manifold block 50*b*. The data lines 44 are signal lines that deliver the pressure information detected by each of the pressure sensors 34 to the control circuit 24 of the control module 16. One of the data lines 44 is electrically connected between the terminal A9 of the first connector 18 and the pressure sensor 34 provided in the second manifold block 50*b*. Another of the data lines 44 is electrically connected between the terminal A10 of the first connector 18 and the terminal B9 of the second connector 20. Similarly, the other data lines 44 are electrically connected between the terminal A11 and the terminal B10, and between the terminal A12 and the terminal B11.

A clock line 46 is provided in the second manifold block 50*b*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector

20. The clock line 46 is connected to the pressure sensor 34 that is provided in the second manifold block 50*b*.

Two internal electrical power source lines 48 are provided in the second manifold block 50*b*. One of the internal electrical power source lines 48 is electrically connected between the terminal A14 of the first connector 18 and the terminal B14 of the second connector 20. The other of the internal electrical power source lines 48 is electrically connected between the terminal A15 of the first connector 18 and the terminal B15 of the second connector 20. Each of the two internal electrical power source lines 48 is connected to the pressure sensor 34 that is provided in the second manifold block 50*b*.

[Configuration of the Third Solenoid Valve Module]

The third solenoid valve module 12*c* includes a third manifold block 50*c* and a third solenoid valve block 52*c*.

A flow path 54 is formed in the third manifold block 50*c*. Compressed air that is delivered from the terminal air supply and exhaust block 14*b* flows through the interior of the flow path 54. The compressed air is delivered to a pneumatic device or the like from the third manifold block 50*c*.

The third solenoid valve block 52*c* includes the solenoid valve 28. The solenoid valve 28 in the third solenoid valve block 52*c* includes two coils 32.

A common electrical power source line 40 is provided in the third solenoid valve block 52*c*. The common electrical power source line 40 is electrically connected between the terminal A0 of the first connector 18 and the terminal B0 of the second connector 20. The common electrical power source line 40 is connected to one end of each of the coils 32 of the solenoid valve 28 in the third solenoid valve block 52*c*.

A plurality of control lines 42 are provided in the third manifold block 50*c*. One of the control lines 42 is electrically connected between the terminal A1 of the first connector 18 and the other end of one of the coils 32 of the solenoid valve 28 in the third solenoid valve block 52*c*. Another of the control lines 42 is electrically connected between the terminal A2 of the first connector 18 and the other end of the other of the coils 32 of the solenoid valve 28 in the third solenoid valve block 52*c*.

Another of the control lines 42 is electrically connected between the terminal A3 of the first connector 18 and the terminal B1 of the second connector 20. Similarly, the other control lines 42 are electrically connected between the terminal A4 and the terminal B2, between the terminal A5 and the terminal B3, between the terminal A6 and the terminal B4, between the terminal A7 and the terminal B5, and between the terminal A8 and the terminal B6.

A plurality of data lines 44 are provided in the third manifold block 50*c*. The data lines 44 are signal lines that deliver the pressure information detected by each of the pressure sensors 34 to the control circuit 24 of the control module 16. One of the data lines 44 is electrically connected between the terminal A9 of the first connector 18 and the terminal B9 of the second connector 20. Similarly, the other data lines 44 are electrically connected between the terminal A10 and the terminal B10, between the terminal A11 and the terminal B11, and between the terminal A12 and the terminal B12.

A clock line 46 is provided in the third manifold block 50*c*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20.

Two internal electrical power source lines 48 are provided in the third manifold block 50*c*. One of the internal electrical power source lines 48 is electrically connected between the terminal A14 of the first connector 18 and the terminal B14 of the second connector 20. The other of the internal electrical power source lines 48 is electrically connected between the terminal A15 of the first connector 18 and the terminal B15 of the second connector 20.

[Configuration of the Fourth Solenoid Valve Module]

The fourth solenoid valve module 12*d* includes a fourth manifold block 50*d* and a fourth solenoid valve block 52*d*.

A flow path 54 is formed in the fourth manifold block 50*d*. Compressed air that is delivered from the terminal air supply and exhaust block 14*b* flows through the interior of the flow path 54. The compressed air is delivered to a pneumatic device or the like from the fourth manifold block 50*d*.

The fourth solenoid valve block 52*d* includes the solenoid valve 28. The solenoid valve 28 in the fourth solenoid valve block 52*d* includes one coil 32.

A common electrical power source line 40 is provided in the fourth solenoid valve block 52*d*. The common electrical power source line 40 is electrically connected between the terminal A0 of the first connector 18 and the terminal B0 of the second connector 20. The common electrical power source line 40 is connected to one end of the coil 32 of the solenoid valve 28 in the fourth solenoid valve block 52*d*.

A plurality of control lines 42 are provided in the fourth manifold block 50*d*. One of the control lines 42 is electrically connected between the terminal A1 of the first connector 18 and the other end of the coil 32 of the solenoid valve 28 in the fourth solenoid valve block 52*d*.

Another of the control lines 42 is electrically connected between the terminal A2 of the first connector 18 and the terminal B1 of the second connector 20. Similarly, the other control lines 42 are electrically connected between the terminal A3 and the terminal B2, between the terminal A4 and the terminal B3, between the terminal A5 and the terminal B4, between the terminal A6 and the terminal B5, between the terminal A7 and the terminal B6, and between the terminal A8 and the terminal B7.

A plurality of data lines 44 are provided in the fourth manifold block 50*d*. The data lines 44 are signal lines that deliver the pressure information detected by each of the pressure sensors 34 to the control circuit 24 of the control module 16. One of the data lines 44 is electrically connected between the terminal A9 of the first connector 18 and the terminal B9 of the second connector 20. Similarly, the other data lines 44 are electrically connected between the terminal A10 and the terminal B10, between the terminal A11 and the terminal B11, and between the terminal A12 and the terminal B12.

A clock line 46 is provided in the fourth manifold block 50*d*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20.

Two internal electrical power source lines 48 are provided in the fourth manifold block 50*d*. One of the internal electrical power source lines 48 is electrically connected between the terminal A14 of the first connector 18 and the terminal B14 of the second connector 20. The other of the internal electrical power source lines 48 is electrically connected between the terminal A15 of the first connector 18 and the terminal B15 of the second connector 20.

[Configuration of the Terminal Air Supply and Exhaust Block]

Compressed air is supplied from the exterior to the terminal air supply and exhaust block 14*b*. The compressed air supplied to the terminal air supply and exhaust block 14*b* is delivered to the third solenoid valve module 12*c* and the fourth solenoid valve module 12*d*.

The pressure sensor 34 is provided in the terminal air supply and exhaust block 14*b*. The pressure sensor 34 provided in the terminal air supply and exhaust block 14*b* detects the pressure of the compressed air supplied to the terminal air supply and exhaust block 14*b*.

The terminal air supply and exhaust block 14*b* includes the solenoid valve 28. The solenoid valve 28 in the terminal air supply and exhaust block 14*b* includes one coil 32.

A common electrical power source line 40 is provided in the terminal air supply and exhaust block 14*b*. The common electrical power source line 40 is electrically connected between the terminal A0 of the first connector 18 and one end of the coil 32 of the solenoid valve 28 in the terminal air supply and exhaust block 14*b*.

A control line 42 is provided in the terminal air supply and exhaust block 14*b*. The control line 42 is electrically connected between the terminal A1 of the first connector 18 and the other end of the coil 32 of the solenoid valve 28 in the terminal air supply and exhaust block 14*b*.

A data line 44 is provided in the terminal air supply and exhaust block 14*b*. The data line 44 is a signal line that delivers the pressure information detected by each of the pressure sensors 34 to the control circuit 24 of the control module 16.

A clock line 46 is provided in the terminal air supply and exhaust block 14*b*. The clock line 46 is a signal line that delivers a clock signal from the control circuit 24 of the control module 16 to each of the pressure sensors 34. The clock line 46 is electrically connected between the terminal A13 of the first connector 18 and the pressure sensor 34 in the terminal air supply and exhaust block 14*b*.

Two internal electrical power source lines 48 are provided in the terminal air supply and exhaust block 14*b*. One of the internal electrical power source lines 48 is electrically connected between the terminal A14 of the first connector 18 and the pressure sensor 34 in the terminal air supply and exhaust block 14*b*. The other of the internal electrical power source lines 48 is electrically connected between the terminal A15 of the first connector 18 and the pressure sensor 34 in the terminal air supply and exhaust block 14*b*.

Operations and Effects

Conventionally, a pressure sensor has been provided in a tube through which compressed air is delivered from a valve manifold to a pneumatic device or the like. The pressure of the compressed air, which is delivered from the valve manifold to the pneumatic device or the like, is detected by the pressure sensor. Further, conventionally, a pressure sensor has been provided in a tube through which compressed air is delivered from a compressor or the like to a valve manifold. The pressure of the compressed air, which is delivered from the compressor or the like to the valve manifold, is detected by the pressure sensor. A plurality of the pressure sensors are provided with respect to one of the valve manifolds.

Signals output from each of the pressure sensors are delivered to an input unit. Amplification of the signals, and digital conversion of the signals, etc., are carried out by the input unit. Thereafter, the signals are delivered from the input unit to the PLC. Therefore, it is necessary for the user to perform wiring operations to connect each of the pressure sensors and the input unit. Furthermore, it is necessary for the user to perform wiring operations to connect the input unit and the PLC. Further, since those wirings are arranged externally of the valve manifold, a problem arises in that the wiring configuration becomes complicated.

Thus, in the valve manifold 10 according to the present embodiment, the manifold block 50 of each of the solenoid valve modules 12 includes the data lines 44, the clock line 46, and the internal electrical power source lines 48. Further, each of the air supply and exhaust blocks 14 also includes the data lines 44, the clock line 46, and the internal electrical power source lines 48. Consequently, the wiring operations performed by the user can be reduced. Further, since a portion of the wiring is arranged in the interior of the valve manifold, the wiring configuration can be simplified.

Further, in recent years, reductions in the size and scale of the pressure sensors 34, which are equipped with an amplifier circuit, an AD conversion circuit, a communication circuit and the like, have been progressing.

Thus, in the valve manifold 10 according to the present embodiment, the pressure sensor 34 is provided in the manifold block 50 of each of the solenoid valve modules 12. Further, the pressure sensor 34 is provided in each of the air supply and exhaust blocks 14. Consequently, the wiring operations performed by the user to connect each of the pressure sensors 34 and each of the manifold blocks 50 can be omitted. Furthermore, the wiring configuration can be simplified.

In the valve manifold 10 according to the present embodiment, in each of the solenoid valve modules 12 that have the pressure sensors 34, one of the data lines 44 connected to the terminal A9 of the first connector 18 is connected to the pressure sensor 34. Furthermore, another of the data lines 44 is electrically connected between the terminal A10 of the first connector 18 and the terminal B9 of the second connector 20. Similarly, the other data lines 44 are electrically connected between the terminals A11 to A12 and the terminals B10 to B11, respectively. In accordance with such features, the user is allowed to freely connect each of the air supply and exhaust blocks 14 and each of the solenoid valve modules 12 without considering the order in which they are connected.

According to the first embodiment, the common electrical power source lines 40 are connected to the positive electrode of the driving electrical power source 30. In contrast thereto, the common electrical power source lines 40 may be connected to the negative electrode of the driving electrical power source 30.

Further, according to the first embodiment, the control lines 42 are connected to the negative electrode of the driving electrical power source 30. In contrast thereto, in the case that the common electrical power source lines 40 are connected to the negative electrode of the driving electrical power source 30, the control lines 42 may be connected to the positive electrode of the driving electrical power source 30.

The number of each of the common electrical power source lines 40, the control lines 42, the data lines 44, the clock lines 46, and the internal electrical power source lines 48 is not limited to the number shown in the first embodiment, and may be appropriately increased or decreased in accordance with the configuration of the valve manifold 10.

Second Embodiment

Figure 2:
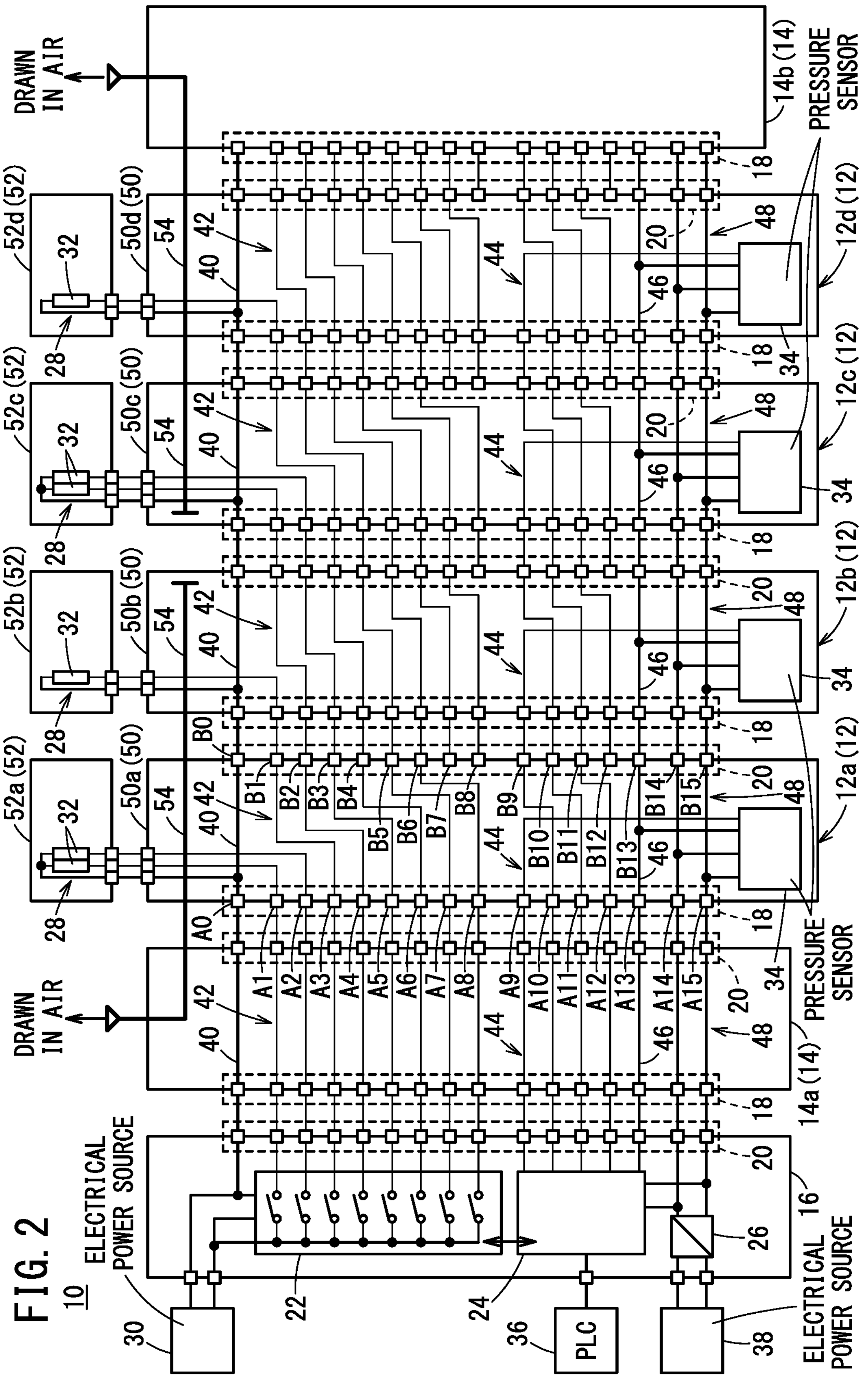
FIG. 2 is a schematic diagram of the valve manifold.

FIG. 2 is a schematic diagram of a valve manifold 10. The valve manifold 10 according to the present embodiment is used in a vacuum pump system. The vacuum pump system is a system in which a negative pressure is generated by a vacuum pump connected to the valve manifold 10, and draws in air from a pneumatic device that is connected to the valve manifold 10. In the vacuum pump system, the pneumatic device, for example, is a suction pad or the like.

In the valve manifold 10, a plurality of solenoid valve modules 12 and a plurality of air supply and exhaust blocks 14 can be connected to each other. A control module 16 is connected with respect to the connected plurality of solenoid valve modules 12, and the plurality of air supply and exhaust blocks 14.

The valve manifold 10 according to the present embodiment includes, as the solenoid valve modules 12, a first solenoid valve module 12*a*, a second solenoid valve module 12*b*, a third solenoid valve module 12*c*, and a fourth solenoid valve module 12*d*. The valve manifold 10 according to the present embodiment includes, as the air supply and exhaust blocks 14, an intermediate air supply and exhaust block 14*a*, and a terminal air supply and exhaust block 14*b*. In the valve manifold 10 according to the present embodiment, the control module 16, the intermediate air supply and exhaust block 14*a*, the first solenoid valve module 12*a*, the second solenoid valve module 12*b*, the third solenoid valve module 12*c*, the fourth solenoid valve module 12*d*, and the terminal air supply and exhaust block 14*b* are connected sequentially in this order.

The mode of connection of the present embodiment illustrated in FIG. 2 is shown as an example, and the order in which each of the solenoid valve modules 12 and each of the air supply and exhaust blocks 14 are connected is selected by the user. Further, the number of the solenoid valve modules 12 and the number of the air supply and exhaust blocks 14 in the valve manifold 10 are selected by the user.

Each of the intermediate air supply and exhaust block 14*a*, the first solenoid valve module 12*a*, the second solenoid valve module 12*b*, the third solenoid valve module 12*c*, the fourth solenoid valve module 12*d*, and the terminal air supply and exhaust block 14*b* includes a first connector 18. Each of the first connectors 18 has terminals A0 to A15.

Each of the control module 16, the intermediate air supply and exhaust block 14*a*, the first solenoid valve module 12*a*, the second solenoid valve module 12*b*, the third solenoid valve module 12*c*, and the fourth solenoid valve module 12*d* includes a second connector 20. Each of the second connectors 20 has terminals B0 to B15.

By the first connectors 18 and the second connectors 20 being connected, the control module 16, the intermediate air supply and exhaust block 14*a*, the first solenoid valve module 12*a*, the second solenoid valve module 12*b*, the third solenoid valve module 12*c*, the fourth solenoid valve module 12*d*, and the terminal air supply and exhaust block 14*b* are connected.

When the first connectors 18 and the second connectors 20 are connected, the terminals A0 of the first connectors 18 and the terminals B0 of the second connectors 20 are brought into contact with each other, and the terminals A0 and the terminals B0 are electrically connected. Similarly, when the first connectors 18 and the second connectors 20 are connected, each of the terminals A1 to A15 of the first connectors 18 and each of the terminals B1 to B15 of the second connectors 20 come into contact with each other, and each of the terminals A1 to A15 and each of the terminals B1 to B15 are electrically connected.

The terminal A9 of each of the first connectors 18 corresponds to the first terminal of the present invention. The terminal A10 of each of the first connectors 18 corresponds to the second terminal of the present invention. The terminal B9 of each of the second connectors 20 corresponds to the third terminal of the present invention.

[Configuration of the Control Module]

The control module 16 includes an output driver 22, a control circuit 24, and an internal electrical power source 26. The output driver 22 outputs control signals. Solenoid valves 28 respectively provided in the solenoid valve modules 12 are driven on the basis of control signals. The output driver 22 includes semiconductor switches that are provided corresponding to the respective solenoid valves 28. By turning on the semiconductor switches, electrical power is supplied from a driving electrical power source 30 to the coils 32 of the solenoid valves 28.

The control circuit 24 serves to control the output driver 22. The control circuit 24 carries out communication with pressure sensors 34 provided in the first solenoid valve module 12*a*, the second solenoid valve module 12*b*, the third solenoid valve module 12*c*, and the fourth solenoid valve module 12*d*. Each of the pressure sensors 34 is equipped with an amplifier circuit, an AD conversion circuit, a communication circuit, and the like. Therefore, the pressure sensors 34 are each capable of carrying out communication individually with the control circuit 24. The control circuit 24 communicates with a PLC 36 and other devices. The other devices, for example, are other valve manifolds 10 or the like. The internal electrical power source 26 supplies electrical power to the control circuit 24 and the pressure sensors 34.

The control module 16 includes an electrical power interface (not shown), and a communication interface (not shown). The electrical power interface adjusts the voltage of the electrical power supplied from the driving electrical power source 30, and delivers the adjusted electrical power to the output driver 22 and the solenoid valves 28. The electrical power interface adjusts the voltage of the electrical power supplied from a controlling electrical power source 38, and delivers the adjusted electrical power to the control circuit 24 and the pressure sensors 34.

In the second connector 20 of the control module 16, the terminal B0 is connected to a positive electrode of the driving electrical power source 30. The terminals B1 to B8 are connected to respective switches of the output driver 22. The terminals B9 to B13 are connected to the control circuit 24. The terminal B14 is connected to a positive electrode of the internal electrical power source 26. The terminal B15 is connected to a negative electrode of the internal electrical power source 26.

[Configuration of the Intermediate Air Supply and Exhaust Block]

A vacuum pump (not shown) is connected to the intermediate air supply and exhaust block 14*a*. The air in the interior of the intermediate air supply and exhaust block 14*a* is drawn in by the vacuum pump.

A common electrical power source line 40 is provided in the intermediate air supply and exhaust block 14*a*. The common electrical power source line 40 is electrically connected between the terminal A0 of the first connector 18 and the terminal B0 of the second connector 20. The common electrical power source line 40 is connected to the positive electrode of the driving electrical power source 30 via the control module 16.

A plurality of control lines 42 are provided in the intermediate air supply and exhaust block 14*a*. One of the control lines 42 is electrically connected between the terminal A1 of the first connector 18 and the terminal B1 of the second connector 20. Similarly, the other control lines 42 are electrically connected between the terminal A2 and the terminal B2, between the terminal A3 and the terminal B3, between the terminal A4 and the terminal B4, between the terminal A5 and the terminal B5, between the terminal A6 and the terminal B6, between the terminal A7 and the terminal B7, and between the terminal A8 and the terminal B8. The control lines 42 are connected to the negative electrode of the driving electrical power source 30 via the control module 16.

A plurality of data lines 44 are provided in the intermediate air supply and exhaust block 14*a*. The data lines 44 are signal lines that deliver the pressure information detected by each of the pressure sensors 34 to the control circuit 24 of the control module 16. One of the data lines 44 is electrically connected between the terminal A9 of the first connector 18 and the terminal B9 of the second connector 20. Similarly, the other data lines 44 are electrically connected between the terminal A10 and the terminal B10, between the terminal A11 and the terminal B11, and between the terminal A12 and the terminal B12.

A clock line 46 is provided in the intermediate air supply and exhaust block 14*a*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20.

Two internal electrical power source lines 48 are provided in the intermediate air supply and exhaust block 14*a*. One of the internal electrical power source lines 48 is electrically connected between the terminal A14 of the first connector 18 and the terminal B14 of the second connector 20. Similarly, the other of the internal electrical power source lines 48 is electrically connected between the terminal A15 and the terminal B15.

[Configuration of the First Solenoid Valve Module]

The first solenoid valve module 12*a* includes a first manifold block 50*a* and a first solenoid valve block 52*a*.

A flow path 54 is formed in the first manifold block 50*a*. The air in the interior of the flow path 54 is drawn in by a vacuum pump connected to the intermediate air supply and exhaust block 14*a*. The first manifold block 50*a* draws in air from a pneumatic device or the like that is connected to the first manifold block 50*a*.

The pressure sensor 34 is provided in the first manifold block 50*a*. The pressure sensor 34 provided in the first manifold block 50*a* detects the pressure of the air drawn in from the pneumatic device or the like that is connected to the first manifold block 50*a*.

The first solenoid valve block 52*a* includes the solenoid valve 28. The solenoid valve 28 in the first solenoid valve block 52*a* includes two coils 32.

A common electrical power source line 40 is provided in the first solenoid valve block 52*a*. The common electrical power source line 40 is electrically connected between the terminal A0 of the first connector 18 and the terminal B0 of the second connector 20. The common electrical power source line 40 is connected to one end of each of the coils 32 of the solenoid valve 28 in the first solenoid valve block 52*a*.

A plurality of control lines 42 are provided in the first manifold block 50*a*. One of the control lines 42 is electrically connected between the terminal A1 of the first connector 18 and the other end of one of the coils 32 of the solenoid valve 28 in the first solenoid valve block 52*a*. Another of the control lines 42 is electrically connected between the terminal A2 of the first connector 18 and the other end of the other of the coils 32 of the solenoid valve 28 in the first solenoid valve block 52*a*.

Another of the control lines 42 is electrically connected between the terminal A3 of the first connector 18 and the terminal B1 of the second connector 20. Similarly, the other control lines 42 are electrically connected between the terminal A4 and the terminal B2, between the terminal A5 and the terminal B3, between the terminal A6 and the terminal B4, between the terminal A7 and the terminal B5, and between the terminal A8 and the terminal B6.

A plurality of data lines 44 are provided in the first manifold block 50*a*. The data lines 44 are signal lines that deliver the pressure information detected by each of the pressure sensors 34 to the control circuit 24 of the control module 16. One of the data lines 44 is electrically connected between the terminal A9 of the first connector 18 and the pressure sensor 34 provided in the first manifold block 50*a*. Another of the data lines 44 is electrically connected between the terminal A10 of the first connector 18 and the terminal B9 of the second connector 20. Similarly, the other data lines 44 are electrically connected between the terminal A11 and the terminal B10, and between the terminal A12 and the terminal B11.

A clock line 46 is provided in the first manifold block 50*a*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20. The clock line 46 is connected to the pressure sensor 34 that is provided in the first manifold block 50*a*.

Two internal electrical power source lines 48 are provided in the first manifold block 50*a*. One of the internal electrical power source lines 48 is electrically connected between the terminal A14 of the first connector 18 and the terminal B14 of the second connector 20. The other of the internal electrical power source lines 48 is electrically connected between the terminal A15 of the first connector 18 and the terminal B15 of the second connector 20. Each of the two internal electrical power source lines 48 is connected to the pressure sensor 34 that is provided in the first manifold block 50*a*.

[Configuration of the Second Solenoid Valve Module]

The second solenoid valve module 12*b* includes a second manifold block 50*b* and a second solenoid valve block 52*b*.

A flow path 54 is formed in the second manifold block 50*b*. The air in the interior of the flow path 54 is drawn in by a vacuum pump connected to the intermediate air supply and exhaust block 14*a*. The second manifold block 50*b* draws in air from a pneumatic device or the like that is connected to the second manifold block 50*b*.

The pressure sensor 34 is provided in the second manifold block 50*b*. The pressure sensor 34 provided in the second manifold block 50*b* detects the pressure of the air drawn in from the pneumatic device or the like that is connected to the second manifold block 50*b*.

The second solenoid valve block 52*b* includes the solenoid valve 28. The solenoid valve 28 in the second solenoid valve block 52*b* includes one coil 32.

A common electrical power source line 40 is provided in the second solenoid valve block 52*b*. The common electrical power source line 40 is electrically connected between the terminal A0 of the first connector 18 and the terminal B0 of the second connector 20. The common electrical power source line 40 is connected to one end of the coil 32 of the solenoid valve 28 in the second solenoid valve block 52*b*.

A plurality of control lines 42 are provided in the second manifold block 50*b*. One of the control lines 42 is electrically connected between the terminal A1 of the first connector 18 and the other end of the coil 32 of the solenoid valve 28 in the second solenoid valve block 52*b*.

Another of the control lines 42 is electrically connected between the terminal A2 of the first connector 18 and the terminal B1 of the second connector 20. Similarly, the other control lines 42 are electrically connected between the terminal A3 and the terminal B2, between the terminal A4 and the terminal B3, between the terminal A5 and the terminal B4, between the terminal A6 and the terminal B5, between the terminal A7 and the terminal B6, and between the terminal A8 and the terminal B7.

A plurality of data lines 44 are provided in the second manifold block 50*b*. The data lines 44 are signal lines that deliver the pressure information detected by each of the pressure sensors 34 to the control circuit 24 of the control module 16. One of the data lines 44 is electrically connected between the terminal A9 of the first connector 18 and the pressure sensor 34 provided in the second manifold block 50*b*. Another of the data lines 44 is electrically connected between the terminal A10 of the first connector 18 and the terminal B9 of the second connector 20. Similarly, the other data lines 44 are electrically connected between the terminal A11 and the terminal B10, and between the terminal A12 and the terminal B11.

A clock line 46 is provided in the second manifold block 50*b*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20. The clock line 46 is connected to the pressure sensor 34 that is provided in the second manifold block 50*b*.

Two internal electrical power source lines 48 are provided in the second manifold block 50*b*. One of the internal electrical power source lines 48 is electrically connected between the terminal A14 of the first connector 18 and the terminal B14 of the second connector 20. The other of the internal electrical power source lines 48 is electrically connected between the terminal A15 of the first connector 18 and the terminal B15 of the second connector 20. Each of the two internal electrical power source lines 48 is connected to the pressure sensor 34 that is provided in the second manifold block 50*b*.

[Configuration of the Third Solenoid Valve Module]

The third solenoid valve module 12*c* includes a third manifold block 50*c* and a third solenoid valve block 52*c*.

A flow path 54 is formed in the third manifold block 50*c*. The air in the interior of the flow path 54 is drawn in by a vacuum pump connected to the later-described terminal air supply and exhaust block 14*b*. The third manifold block 50*c* draws in air from a pneumatic device or the like that is connected to the third manifold block 50*c*.

The pressure sensor 34 is provided in the third manifold block 50*c*. The pressure sensor 34 provided in the third manifold block 50*c* detects the pressure of the air drawn in from the pneumatic device or the like that is connected to the third manifold block 50*c*.

The third solenoid valve block 52*c* includes the solenoid valve 28. The solenoid valve 28 in the third solenoid valve block 52*c* includes two coils 32.

A common electrical power source line 40 is provided in the third solenoid valve block 52*c*. The common electrical power source line 40 is electrically connected between the terminal A0 of the first connector 18 and the terminal B0 of the second connector 20. The common electrical power source line 40 is connected to one end of each of the coils 32 of the solenoid valve 28 in the third solenoid valve block 52*c*.

A plurality of control lines 42 are provided in the third manifold block 50*c*. One of the control lines 42 is electrically connected between the terminal A1 of the first connector 18 and the other end of one of the coils 32 of the solenoid valve 28 in the third solenoid valve block 52*c*. Another of the control lines 42 is electrically connected between the terminal A2 of the first connector 18 and the other end of the other of the coils 32 of the solenoid valve 28 in the third solenoid valve block 52*c*.

Another of the control lines 42 is electrically connected between the terminal A3 of the first connector 18 and the terminal B1 of the second connector 20. Similarly, the other control lines 42 are electrically connected between the terminal A4 and the terminal B2, between the terminal A5 and the terminal B3, between the terminal A6 and the terminal B4, between the terminal A7 and the terminal B5, and between the terminal A8 and the terminal B6.

A plurality of data lines 44 are provided in the third manifold block 50*c*. The data lines 44 are signal lines that deliver the pressure information detected by each of the pressure sensors 34 to the control circuit 24 of the control module 16. One of the data lines 44 is electrically connected between the terminal A9 of the first connector 18 and the pressure sensor 34 provided in the third manifold block 50*c*. Another of the data lines 44 is electrically connected between the terminal A10 of the first connector 18 and the terminal B9 of the second connector 20. Similarly, the other data lines 44 are electrically connected between the terminal A11 and the terminal B10, and between the terminal A12 and the terminal B11.

A clock line 46 is provided in the third manifold block 50*c*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20. The clock line 46 is connected to the pressure sensor 34 that is provided in the third manifold block 50*c*.

Two internal electrical power source lines 48 are provided in the third manifold block 50*c*. One of the internal electrical power source lines 48 is electrically connected between the terminal A14 of the first connector 18 and the terminal B14 of the second connector 20. The other of the internal electrical power source lines 48 is electrically connected between the terminal A15 of the first connector 18 and the terminal B15 of the second connector 20. Each of the two internal electrical power source lines 48 is connected to the pressure sensor 34 that is provided in the third manifold block 50*c*.

[Configuration of the Fourth Solenoid Valve Module]

The fourth solenoid valve module 12*d* includes a fourth manifold block 50*d* and a fourth solenoid valve block 52*d*.

A flow path 54 is formed in the fourth manifold block 50*d*. The air in the interior of the flow path 54 is drawn in by a vacuum pump connected to the later-described terminal air supply and exhaust block 14*b*. The fourth manifold block 50*d* draws in air from a pneumatic device or the like that is connected to the fourth manifold block 50*d*.

The pressure sensor 34 is provided in the fourth manifold block 50*d*. The pressure sensor 34 provided in the fourth manifold block 50*d* detects the pressure of the air drawn in from the pneumatic device or the like that is connected to the fourth manifold block 50*d*.

The fourth solenoid valve block 52*d* includes the solenoid valve 28. The solenoid valve 28 in the fourth solenoid valve block 52*d* includes one coil 32.

A common electrical power source line 40 is provided in the fourth solenoid valve block 52*d*. The common electrical power source line 40 is electrically connected between the terminal A0 of the first connector 18 and the terminal B0 of the second connector 20. The common electrical power source line 40 is connected to one end of the coil 32 of the solenoid valve 28 in the fourth solenoid valve block 52*d*.

A plurality of control lines 42 are provided in the fourth manifold block 50*d*. One of the control lines 42 is electrically connected between the terminal A1 of the first connector 18 and the other end of the coil 32 of the solenoid valve 28 in the fourth solenoid valve block 52*d*.

Another of the control lines 42 is electrically connected between the terminal A2 of the first connector 18 and the terminal B1 of the second connector 20. Similarly, the other control lines 42 are electrically connected between the terminal A3 and the terminal B2, between the terminal A4 and the terminal B3, between the terminal A5 and the terminal B4, between the terminal A6 and the terminal B5, between the terminal A7 and the terminal B6, and between the terminal A8 and the terminal B7.

A plurality of data lines 44 are provided in the fourth manifold block 50*d*. The data lines 44 are signal lines that deliver the pressure information detected by each of the pressure sensors 34 to the control circuit 24 of the control module 16. One of the data lines 44 is electrically connected between the terminal A9 of the first connector 18 and the pressure sensor 34 provided in the fourth manifold block 50*d*. Another of the data lines 44 is electrically connected between the terminal A10 of the first connector 18 and the terminal B9 of the second connector 20. Similarly, the other data lines 44 are electrically connected between the terminal A11 and the terminal B10, and between the terminal A12 and the terminal B11.

A clock line 46 is provided in the fourth manifold block 50*d*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20. The clock line 46 is connected to the pressure sensor 34 that is provided in the fourth manifold block 50*d*.

Two internal electrical power source lines 48 are provided in the fourth manifold block 50*d*. One of the internal electrical power source lines 48 is electrically connected between the terminal A14 of the first connector 18 and the terminal B14 of the second connector 20. The other of the internal electrical power source lines 48 is electrically connected between the terminal A15 of the first connector 18 and the terminal B15 of the second connector 20. Each of the two internal electrical power source lines 48 is connected to the pressure sensor 34 that is provided in the fourth manifold block 50*d*.

[Configuration of the Terminal Air Supply and Exhaust Block]

A vacuum pump (not shown) is connected to the terminal air supply and exhaust block 14*b*. Air is drawn in by the vacuum pump.

Third Embodiment

Figure 3:
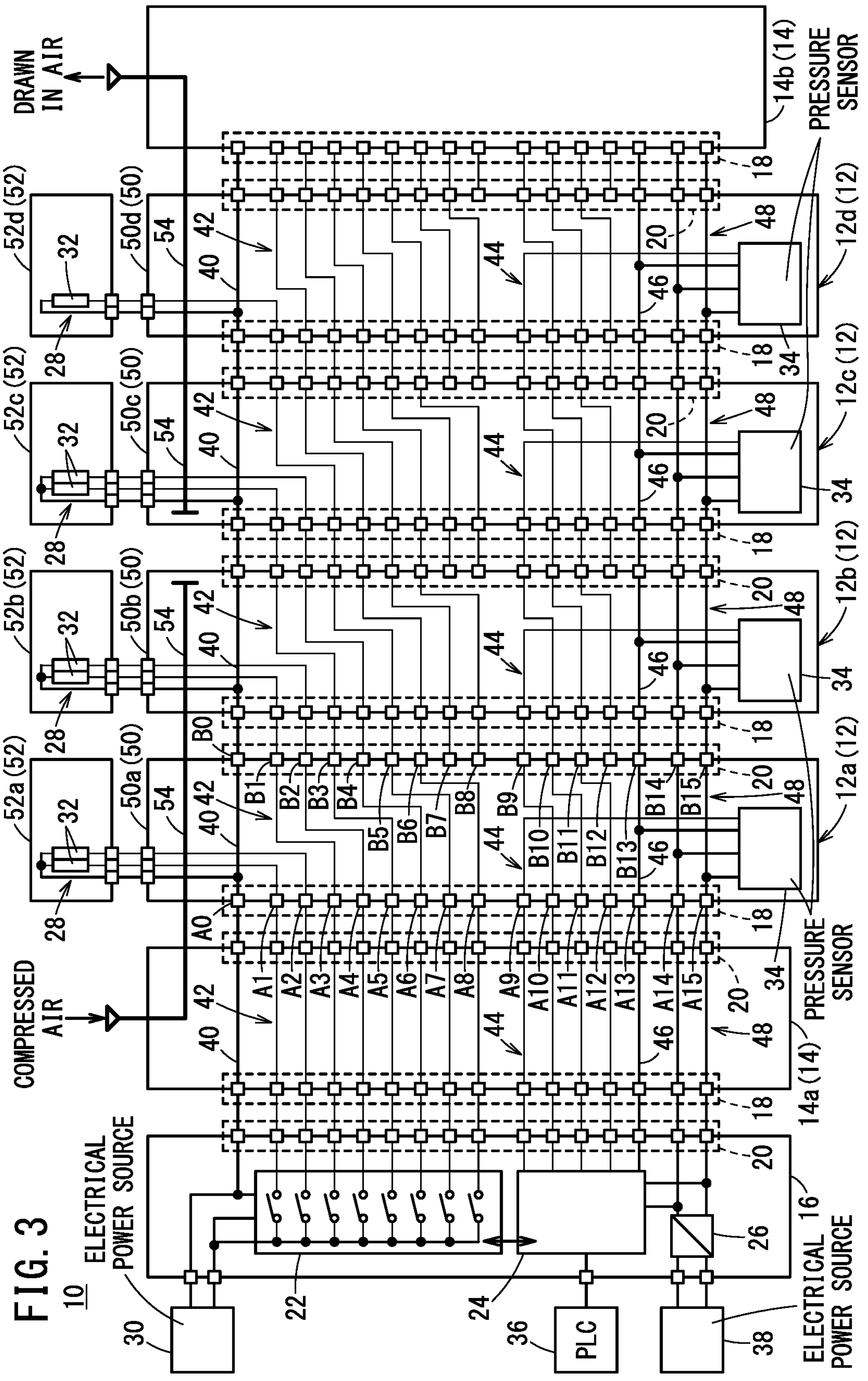
FIG. 3 is a schematic diagram of the valve manifold.

FIG. 3 is a schematic diagram of the valve manifold 10. The valve manifold 10 according to the present embodiment is used in an air cylinder system and a vacuum pump system. The air cylinder system is a system that delivers to a pneumatic device the compressed air supplied from an air pump connected to the valve manifold 10, and thereby causes the pneumatic device to be operated. In the air cylinder system, the pneumatic device, for example, is an air cylinder, an air chuck, or the like. The vacuum pump system is a system in which a negative pressure is generated by a vacuum pump connected to the valve manifold 10, and draws in air from a pneumatic device that is connected to the valve manifold 10. In the vacuum pump system, the pneumatic device, for example, is a suction pad or the like.

In the valve manifold 10, a plurality of solenoid valve modules 12 and a plurality of air supply and exhaust blocks 14 can be connected to each other. A control module 16 is connected with respect to the connected plurality of solenoid valve modules 12, and the plurality of air supply and exhaust blocks 14.

The valve manifold 10 according to the present embodiment includes, as the solenoid valve modules 12, a first solenoid valve module 12*a*, a second solenoid valve module 12*b*, a third solenoid valve module 12*c*, and a fourth solenoid valve module 12*d*. The valve manifold 10 according to the present embodiment includes, as the air supply and exhaust blocks 14, an intermediate air supply and exhaust block 14*a*, and a terminal air supply and exhaust block 14*b*. In the valve manifold 10 according to the present embodiment, the control module 16, the intermediate air supply and exhaust block 14*a*, the first solenoid valve module 12*a*, the second solenoid valve module 12*b*, the third solenoid valve module 12*c*, the fourth solenoid valve module 12*d*, and the terminal air supply and exhaust block 14*b* are connected sequentially in this order.

The mode of connection of the present embodiment illustrated in FIG. 3 is shown as an example, and the order in which each of the solenoid valve modules 12 and each of the air supply and exhaust blocks 14 are connected is selected by the user. Further, the number of the solenoid valve modules 12 and the number of the air supply and exhaust blocks 14 in the valve manifold 10 are selected by the user.

Each of the intermediate air supply and exhaust block 14*a*, the first solenoid valve module 12*a*, the second solenoid valve module 12*b*, the third solenoid valve module 12*c*, the fourth solenoid valve module 12*d*, and the terminal air supply and exhaust block 14*b* includes a first connector 18. Each of the first connectors 18 has terminals A0 to A15.

Each of the control module 16, the intermediate air supply and exhaust block 14*a*, the first solenoid valve module 12*a*, the second solenoid valve module 12*b*, the third solenoid valve module 12*c*, and the fourth solenoid valve module 12*d* includes a second connector 20. Each of the second connectors 20 has terminals B0 to B15.

By the first connectors 18 and the second connectors 20 being connected, the control module 16, the intermediate air supply and exhaust block 14*a*, the first solenoid valve module 12*a*, the second solenoid valve module 12*b*, the third solenoid valve module 12*c*, the fourth solenoid valve module 12*d*, and the terminal air supply and exhaust block 14*b* are connected.

When the first connectors 18 and the second connectors 20 are connected, the terminals A0 of the first connectors 18 and the terminals B0 of the second connectors 20 are brought into contact with each other, and the terminals A0 and the terminals B0 are electrically connected. Similarly, when the first connectors 18 and the second connectors 20 are connected, each of the terminals A1 to A15 of the first connectors 18 and each of the terminals B1 to B15 of the second connectors 20 come into contact with each other, and each of the terminals A1 to A15 and each of the terminals B1 to B15 are electrically connected.

The terminal A9 of each of the first connectors 18 corresponds to the first terminal of the present invention. The terminal A10 of each of the first connectors 18 corresponds to the second terminal of the present invention. The terminal B9 of each of the second connectors 20 corresponds to the third terminal of the present invention.

[Configuration of the Control Module]

The control module 16 includes an output driver 22, a control circuit 24, and an internal electrical power source 26. The output driver 22 outputs control signals. Solenoid valves 28 respectively provided in the solenoid valve modules 12 are driven on the basis of control signals. The output driver 22 includes semiconductor switches that are provided corresponding to the respective solenoid valves 28. By turning on the semiconductor switches, electrical power is supplied from a driving electrical power source 30 to the coils 32 of the solenoid valves 28.

The control circuit 24 serves to control the output driver 22. The control circuit 24 carries out communication with pressure sensors 34 provided in the first solenoid valve module 12*a*, the second solenoid valve module 12*b*, the third solenoid valve module 12*c*, and the fourth solenoid valve module 12*d*. Each of the pressure sensors 34 is equipped with an amplifier circuit, an AD conversion circuit, a communication circuit, and the like. Therefore, the pressure sensors 34 are each capable of carrying out communication individually with the control circuit 24. The control circuit 24 communicates with a PLC 36 and other devices. The other devices, for example, are other valve manifolds 10 or the like. The internal electrical power source 26 supplies electrical power to the control circuit 24 and the pressure sensors 34.

The control module 16 includes an electrical power interface (not shown), and a communication interface (not shown). The electrical power interface adjusts the voltage of the electrical power supplied from the driving electrical power source 30, and delivers the adjusted electrical power to the output driver 22 and the solenoid valves 28. The electrical power interface adjusts the voltage of the electrical power supplied from a controlling electrical power source 38, and delivers the adjusted electrical power to the control circuit 24 and the pressure sensors 34.

In the second connector 20 of the control module 16, the terminal B0 is connected to a positive electrode of the driving electrical power source 30. The terminals B1 to B8 are connected to respective switches of the output driver 22. The terminals B9 to B13 are connected to the control circuit 24. The terminal B14 is connected to a positive electrode of the internal electrical power source 26. The terminal B15 is connected to a negative electrode of the internal electrical power source 26.

[Configuration of the Intermediate Air Supply and Exhaust Block]

An air pump (not shown) is connected to the intermediate air supply and exhaust block 14*a*. Compressed air is supplied from the air pump to the intermediate air supply and exhaust block 14*a*. The compressed air supplied to the intermediate air supply and exhaust block 14*a* is delivered to the first solenoid valve module 12*a* and the second solenoid valve module 12*b*.

A common electrical power source line 40 is provided in the intermediate air supply and exhaust block 14*a*. The common electrical power source line 40 is electrically connected between the terminal A0 of the first connector 18 and the terminal B0 of the second connector 20. The common electrical power source line 40 is connected to the positive electrode of the driving electrical power source 30 via the control module 16.

A plurality of control lines 42 are provided in the intermediate air supply and exhaust block 14*a*. One of the control lines 42 is electrically connected between the terminal A1 of the first connector 18 and the terminal B1 of the second connector 20. Similarly, the other control lines 42 are electrically connected between the terminal A2 and the terminal B2, between the terminal A3 and the terminal B3, between the terminal A4 and the terminal B4, between the terminal A5 and the terminal B5, between the terminal A6 and the terminal B6, between the terminal A7 and the terminal B7, and between the terminal A8 and the terminal B8. The control lines 42 are connected to the negative electrode of the driving electrical power source 30 via the control module 16.

A plurality of data lines 44 are provided in the intermediate air supply and exhaust block 14*a*. The data lines 44 are signal lines that deliver the pressure information detected by each of the pressure sensors 34 to the control circuit 24 of the control module 16. One of the data lines 44 is electrically connected between the terminal A9 of the first connector 18 and the terminal B9 of the second connector 20. Similarly, the other data lines 44 are electrically connected between the terminal A10 and the terminal B10, between the terminal A11 and the terminal B11, and between the terminal A12 and the terminal B12.

A clock line 46 is provided in the intermediate air supply and exhaust block 14*a*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20.

Two internal electrical power source lines 48 are provided in the intermediate air supply and exhaust block 14*a*. One of the internal electrical power source lines 48 is electrically connected between the terminal A14 of the first connector 18 and the terminal B14 of the second connector 20. Similarly, the other of the internal electrical power source lines 48 is electrically connected between the terminal A15 and the terminal B15.

[Configuration of the First Solenoid Valve Module]

The first solenoid valve module 12*a* includes a first manifold block 50*a* and a first solenoid valve block 52*a*.

A flow path 54 is formed in the first manifold block 50*a*. Compressed air that is delivered from the intermediate air supply and exhaust block 14*a* flows through the interior of the flow path 54. Pilot air is delivered from the first manifold block 50*a* to the solenoid valve 28 of the later-described second solenoid valve module 12*b*.

The pressure sensor 34 is provided in the first manifold block 50*a*. The pressure sensor 34 provided in the first manifold block 50*a* detects the pressure of the pilot air delivered from the first manifold block 50*a* to the solenoid valve 28 of the second solenoid valve module 12*b*.

The first solenoid valve block 52*a* includes one of the solenoid valves 28. The solenoid valve 28 in the first solenoid valve block 52*a* includes two coils 32.

A common electrical power source line 40 is provided in the first solenoid valve block 52*a*. The common electrical power source line 40 is electrically connected between the terminal A0 of the first connector 18 and the terminal B0 of the second connector 20. The common electrical power source line 40 is connected to one end of each of the coils 32 of the solenoid valve 28 in the first solenoid valve block 52*a*.

A plurality of the control lines 42 are provided in the first manifold block 50*a*. One of the control lines 42 is electrically connected between the terminal A1 of the first connector 18 and the other end of one of the coils 32 of the solenoid valve 28 in the first solenoid valve block 52*a*. Another of the control lines 42 is electrically connected between the terminal A2 of the first connector 18 and the other end of the other of the coils 32 of the solenoid valve 28 in the first solenoid valve block 52*a*.

Another of the control lines 42 is electrically connected between the terminal A3 of the first connector 18 and the terminal B1 of the second connector 20. Similarly, the other control lines 42 are electrically connected between the terminal A4 and the terminal B2, between the terminal A5 and the terminal B3, between the terminal A6 and the terminal B4, between the terminal A7 and the terminal B5, and between the terminal A8 and the terminal B6.

A plurality of the data lines 44 are provided in the first manifold block 50*a*. The data lines 44 are signal lines that deliver the pressure information detected by each of the pressure sensors 34 to the control circuit 24 of the control module 16. One of the data lines 44 is electrically connected between the terminal A9 of the first connector 18 and the pressure sensor 34 provided in the first manifold block 50*a*. Another of the data lines 44 is electrically connected between the terminal A10 of the first connector 18 and the terminal B9 of the second connector 20. Similarly, data lines 44 are electrically connected between the terminal A11 and the terminal B10, and between the terminal A12 and the terminal B11.

A clock line 46 is provided in the first manifold block 50*a*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20. The clock line 46 is connected to the pressure sensor 34 that is provided in the first manifold block 50*a*.

Two internal electrical power source lines 48 are provided in the first manifold block 50*a*. One of the internal electrical power source lines 48 is electrically connected between the terminal A14 of the first connector 18 and the terminal B14 of the second connector 20. The other of the internal electrical power source lines 48 is electrically connected between the terminal A15 of the first connector 18 and the terminal B15 of the second connector 20. Each of the two internal electrical power source lines 48 is connected to the pressure sensor 34 that is provided in the first manifold block 50*a*.

[Configuration of the Second Solenoid Valve Module]

The second solenoid valve module 12*b* includes a second manifold block 50*b* and a second solenoid valve block 52*b*.

A flow path 54 is formed in the second manifold block 50*b*. Compressed air that is delivered from the intermediate air supply and exhaust block 14*a* flows through the interior of the flow path 54. The compressed air is delivered to the pneumatic device or the like from the second manifold block 50*b*.

The pressure sensor 34 is provided in the second manifold block 50*b*. The pressure sensor 34 provided in the second manifold block 50*b* detects the pressure of the air delivered from the second manifold block 50*b* to the pneumatic device or the like.

The second solenoid valve block 52*b* includes the solenoid valve 28. The solenoid valve 28 in the second solenoid valve block 52*b* includes two coils 32. The solenoid valve 28 is operated by pilot air supplied from the first solenoid valve module 12*a*, and an electromagnetic force generated by the two coils 32.

A common electrical power source line 40 is provided in the second solenoid valve block 52*b*. The common electrical power source line 40 is electrically connected between the terminal A0 of the first connector 18 and the terminal B0 of the second connector 20. The common electrical power source line 40 is connected to one end of each of the coils 32 of the solenoid valve 28 in the second solenoid valve block 52*b*.

A plurality of the control lines 42 are provided in the second manifold block 50*b*. One of the control lines 42 is electrically connected between the terminal A1 of the first connector 18 and the other end of one of the coils 32 of the solenoid valve 28 in the second solenoid valve block 52*b*. Another of the control lines 42 is electrically connected between the terminal A2 of the first connector 18 and the other end of the other of the coils 32 of the solenoid valve 28 in the second solenoid valve block 52*b*.

Another of the control lines 42 is electrically connected between the terminal A3 of the first connector 18 and the terminal B1 of the second connector 20. Similarly, the other control lines 42 are electrically connected between the terminal A4 and the terminal B2, between the terminal A5 and the terminal B3, between the terminal A6 and the terminal B4, between the terminal A7 and the terminal B5, and between the terminal A8 and the terminal B6.

A plurality of the data lines 44 are provided in the second manifold block 50*b*. The data lines 44 are signal lines that deliver the pressure information detected by each of the pressure sensors 34 to the control circuit 24 of the control module 16. One of the data lines 44 is electrically connected between the terminal A9 of the first connector 18 and the pressure sensor 34 provided in the second manifold block 50*b*. Another of the data lines 44 is electrically connected between the terminal A10 of the first connector 18 and the terminal B9 of the second connector 20. Similarly, the other data lines 44 are electrically connected between the terminal A11 and the terminal B10, and between the terminal A12 and the terminal B11.

A clock line 46 is provided in the second manifold block 50*b*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20. The clock line 46 is connected to the pressure sensor 34 that is provided in the second manifold block 50*b*.

Two internal electrical power source lines 48 are provided in the second manifold block 50*b*. One of the internal electrical power source lines 48 is electrically connected between the terminal A14 of the first connector 18 and the terminal B14 of the second connector 20. The other of the internal electrical power source lines 48 is electrically connected between the terminal A15 of the first connector 18 and the terminal B15 of the second connector 20. Each of the two internal electrical power source lines 48 is connected to the pressure sensor 34 that is provided in the second manifold block 50*b*.

[Configuration of the Third Solenoid Valve Module]

The third solenoid valve module 12*c* includes a third manifold block 50*c* and a third solenoid valve block 52*c*.

A flow path 54 is formed in the third manifold block 50*c*. The air in the interior of the flow path 54 is drawn in by a vacuum pump connected to the later-described terminal air supply and exhaust block 14*b*. The third manifold block 50*c* draws in air from a pneumatic device or the like that is connected to the third manifold block 50*c*.

The pressure sensor 34 is provided in the third manifold block 50*c*. The pressure sensor 34 provided in the third manifold block 50*c* detects the pressure of the air drawn in from the pneumatic device or the like that is connected to the third manifold block 50*c*.

The third solenoid valve block 52*c* includes the solenoid valve 28. The solenoid valve 28 in the third solenoid valve block 52*c* includes two coils 32.

A common electrical power source line 40 is provided in the third solenoid valve block 52*c*. The common electrical power source line 40 is electrically connected between the terminal A0 of the first connector 18 and the terminal B0 of the second connector 20. The common electrical power source line 40 is connected to one end of each of the coils 32 of the solenoid valve 28 in the third solenoid valve block 52*c*.

A plurality of control lines 42 are provided in the third manifold block 50*c*. One of the control lines 42 is electrically connected between the terminal A1 of the first connector 18 and the other end of one of the coils 32 of the solenoid valve 28 in the third solenoid valve block 52*c*. Another of the control lines 42 is electrically connected between the terminal A2 of the first connector 18 and the other end of the other of the coils 32 of the solenoid valve 28 in the third solenoid valve block 52*c*.

Another of the control lines 42 is electrically connected between the terminal A3 of the first connector 18 and the terminal B1 of the second connector 20. Similarly, the other control lines 42 are electrically connected between the terminal A4 and the terminal B2, between the terminal A5 and the terminal B3, between the terminal A6 and the terminal B4, between the terminal A7 and the terminal B5, and between the terminal A8 and the terminal B6.

A plurality of data lines 44 are provided in the third manifold block 50*c*. The data lines 44 are signal lines that deliver the pressure information detected by each of the pressure sensors 34 to the control circuit 24 of the control module 16. One of the data lines 44 is electrically connected between the terminal A9 of the first connector 18 and the pressure sensor 34 provided in the third manifold block 50*c*. Another of the data lines 44 is electrically connected between the terminal A10 of the first connector 18 and the terminal B9 of the second connector 20. Similarly, the other data lines 44 are electrically connected between the terminal A11 and the terminal B10, and between the terminal A12 and the terminal B11.

A clock line 46 is provided in the third manifold block 50*c*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20. The clock line 46 is connected to the pressure sensor 34 that is provided in the third manifold block 50*c*.

Two internal electrical power source lines 48 are provided in the third manifold block 50*c*. One of the internal electrical power source lines 48 is electrically connected between the terminal A14 of the first connector 18 and the terminal B14 of the second connector 20. The other of the internal electrical power source lines 48 is electrically connected between the terminal A15 of the first connector 18 and the terminal B15 of the second connector 20. Each of the two internal electrical power source lines 48 is connected to the pressure sensor 34 that is provided in the third manifold block 50*c*.

[Configuration of the Fourth Solenoid Valve Module]

The fourth solenoid valve module 12*d* includes a fourth manifold block 50*d* and a fourth solenoid valve block 52*d*.

A flow path 54 is formed in the fourth manifold block 50*d*. The air in the interior of the flow path 54 is drawn in by a vacuum pump connected to the later-described terminal air supply and exhaust block 14*b*. The fourth manifold block 50*d* draws in air from a pneumatic device or the like that is connected to the fourth manifold block 50*d*.

The pressure sensor 34 is provided in the fourth manifold block 50*d*. The pressure sensor 34 provided in the fourth manifold block 50*d* detects the pressure of the air drawn in from the pneumatic device or the like that is connected to the fourth manifold block 50*d*.

The fourth solenoid valve block 52*d* includes the other of the solenoid valves 28. The solenoid valve 28 in the fourth solenoid valve block 52*d* includes one coil 32.

A common electrical power source line 40 is provided in the fourth solenoid valve block 52*d*. The common electrical power source line 40 is electrically connected between the terminal A0 of the first connector 18 and the terminal B0 of the second connector 20. The common electrical power source line 40 is connected to one end of the coil 32 of the solenoid valve 28 in the fourth solenoid valve block 52*d*.

A plurality of the control lines 42 are provided in the fourth manifold block 50*d*. One of the control lines 42 is electrically connected between the terminal A1 of the first connector 18 and the other end of the coil 32 of the solenoid valve 28 in the fourth solenoid valve block 52*d*.

Another of the control lines 42 is electrically connected between the terminal A2 of the first connector 18 and the terminal B1 of the second connector 20. Similarly, the other control lines 42 are electrically connected between the terminal A3 and the terminal B2, between the terminal A4 and the terminal B3, between the terminal A5 and the terminal B4, between the terminal A6 and the terminal B5, between the terminal A7 and the terminal B6, and between the terminal A8 and the terminal B7.

A plurality of the data lines 44 are provided in the fourth manifold block 50*d*. The data lines 44 are signal lines that deliver the pressure information detected by each of the pressure sensors 34 to the control circuit 24 of the control module 16. One of the data lines 44 is electrically connected between the terminal A9 of the first connector 18 and the pressure sensor 34 provided in the fourth manifold block 50*d*. Another of the data lines 44 is electrically connected between the terminal A10 of the first connector 18 and the terminal B9 of the second connector 20. Similarly, the other data lines 44 are electrically connected between the terminal A11 and the terminal B10, and between the terminal A12 and the terminal B11.

A clock line 46 is provided in the fourth manifold block 50*d*. The clock line 46 is a signal line that delivers a clock signal from the control circuit 24 of the control module 16 to each of the pressure sensors 34. The clock line 46 is electrically connected between the terminal A13 of the first connector 18 and the terminal B13 of the second connector 20. The clock line 46 is connected to the pressure sensor 34 that is provided in the fourth manifold block 50*d*.

Two internal electrical power source lines 48 are provided in the fourth manifold block 50*d*. One of the internal electrical power source lines 48 is electrically connected between the terminal A14 of the first connector 18 and the terminal B14 of the second connector 20. The other of the internal electrical power source lines 48 is electrically connected between the terminal A15 of the first connector 18 and the terminal B15 of the second connector 20. Each of the two internal electrical power source lines 48 is connected to the pressure sensor 34 that is provided in the fourth manifold block 50*d*.

[Configuration of the Terminal Air Supply and Exhaust Block]

A vacuum pump (not shown) is connected to the terminal air supply and exhaust block 14*b*. Air is drawn in by the vacuum pump.

Invention Obtained from the Embodiment

Descriptions will be given below concerning the invention that can be grasped from the above-described embodiment.

In the solenoid valve control device (10) that controls the solenoid valves (28) configured to switch the flow path through which the air is supplied to the pneumatic device, the solenoid valve control device includes the control module (16) configured to output the control signals to control the solenoid valves, and the plurality of solenoid valve modules (12) comprising the control lines (42) connected to the control module and configured to transmit the control signals to the solenoid valves, wherein each of the solenoid valve modules is connected to the control module or to another of the solenoid valve modules, and each of the solenoid valve modules includes the data line (44) configured to transmit to the control module the pressure information detected by the pressure sensor (34) configured to detect the pressure of the air supplied to the pneumatic device, the clock line (46) configured to transmit the clock signal from the control module to the pressure sensor, and the electrical power source line (48) configured to supply the electrical power to drive the pressure sensor from the control module to the pressure sensor. In accordance with such features, the wiring configuration can be simplified.

In the above-described solenoid valve control device, one of the solenoid valve modules may include the pressure sensor. In accordance with this feature, the wiring configuration can be simplified.

In the above-described solenoid valve control device, there may further be included the air supply and exhaust block (14) to which air is supplied from the exterior, and configured to deliver the supplied air to the solenoid valve modules, wherein the air supply and exhaust block is connected to the control module or to one of the solenoid valve modules, and the air supply and exhaust block may include the data line, the clock line, and the electrical power source line. In accordance with such features, the wiring configuration can be simplified.

In the above-described solenoid valve control device, the data line may include the plurality of data lines, each of the solenoid valve modules may be connected to the control module or to another of the solenoid valve modules, each of the solenoid valve modules may include the plurality of data lines, each of the solenoid valve modules may include the first connector (18) and the second connector (20), the first connector may include the first terminal (A9) and the second terminal (A10), the second connector may include the third terminal (B9), one of the plurality of data lines may be electrically connected between the first terminal and the pressure sensor, another of the plurality of data lines may be electrically connected between the second terminal and the third terminal, and in the case that the second connector is connected to the first connector of the other of the solenoid valve modules, the third terminal may be configured to contact the first terminal of the other of the solenoid valve modules. In accordance with such features, the user is allowed to freely connect the air supply and exhaust block and the solenoid valve modules without considering the order in which they are connected.

The present invention is not limited to the above disclosure, and various modifications can be adopted therein without departing from the essence and gist of the present invention.

The invention claimed is:

1. A valve manifold comprising solenoid valves configured to switch a flow path through which air is supplied to a pneumatic device, the valve manifold comprising:

a control module configured to output control signals to control the solenoid valves; and a plurality of solenoid valve modules comprising control lines connected to the control module and configured to transmit the control signals to the solenoid valves;

wherein each of the solenoid valve modules is connected to the control module or to another of the solenoid valve modules; and each of the solenoid valve modules comprises:

means for transmitting to the control module, pressure information detected by a pressure sensor configured to detect a pressure of air supplied to the pneumatic device;

a clock line configured to transmit a clock signal from the control module to the pressure sensor; and an electrical power source line configured to supply electrical power from the control module to the pressure sensor.

2. The valve manifold according to claim 1, wherein one of the solenoid valve modules includes the pressure sensor.

3. A valve manifold comprising solenoid valves configured to switch a flow path through which air is supplied to a pneumatic device, the valve manifold comprising:

a control module configured to output control signals to control the solenoid valves; and a plurality of solenoid valve modules comprising control lines connected to the control module and configured to transmit the control signals to the solenoid valves:

wherein each of the solenoid valve modules is connected to the control module or to another of the solenoid valve modules; and each of the solenoid valve modules comprises:

a data line configured to transmit to the control module, pressure information detected by a pressure sensor configured to detect a pressure of air supplied to the pneumatic device;

a clock line configured to transmit a clock signal from the control module to the pressure sensor; and an electrical power source line configured to supply electrical power from the control module to the pressure sensor, further comprising:

an air supply and exhaust block to which air is supplied from exterior, and configured to deliver the supplied air to the solenoid valve modules;

wherein the air supply and exhaust block is connected to the control module or to one of the solenoid valve modules; and the air supply and exhaust block includes the data line, the clock line, and the electrical power source line.

4. A valve manifold comprising solenoid valves configured to switch a flow path through which air is supplied to a pneumatic device, the valve manifold comprising:

a control module configured to output control signals to control the solenoid valves; and a plurality of solenoid valve modules comprising control lines connected to the control module and configured to transmit the control signals to the solenoid valves;

wherein each of the solenoid valve modules is connected to the control module or to another of the solenoid valve modules; and each of the solenoid valve modules comprises:

a data line configured to transmit to the control module, pressure information detected by a pressure sensor configured to detect a pressure of air supplied to the pneumatic device;

a clock line configured to transmit a clock signal from the control module to the pressure sensor; and an electrical power source line configured to supply electrical power from the control module to the pressure sensor, wherein:

the data line comprises a plurality of data lines;

each of the solenoid valve modules is connected to the control module or to another of the solenoid valve modules;

each of the solenoid valve modules includes the plurality of data lines, each of the solenoid valve modules includes a first connector and a second connector;

the first connector includes a first terminal and a second terminal;

the second connector includes a third terminal;

one of the plurality of data lines is electrically connected between the first terminal and the pressure sensor;

another of the plurality of data lines is electrically connected between the second terminal and the third terminal; and in a case that the second connector is connected to a first connector of the other of the solenoid valve modules, the third terminal is configured to contact the first terminal of the other of the solenoid valve modules.

* * * * *